United States Patent Office 3,097,238
Patented July 9, 1963

---

3,097,238
STABILIZED UNSYMMETRICAL ANHYDRIDES
Paul E. Blatz, Dallas, Tex., assignor to The Dow Chemical Company, Midland, Mich., a corporation of Delaware
No Drawing. Filed Aug. 24, 1959, Ser. No. 835,401
3 Claims. (Cl. 260—546)

The present invention relates to a stabilized unsymmetrical anhydride composition and more particularly it concerns the stabilization of unsymmetrical anhydrides of acetic acid and an acrylic acid by the addition of a nitro- or dinitrobenzene.

Unsymmetrical anhydrides of acetic acid and an acrylic acid are known to be unstable. Depending upon the ambient temperatures, there are two possible reactions that can occur within the unstable unsymmetrical anhydride. Above room temperature a polymerization type reaction tends to predominate while at lower temperatures, the unsymmetrical anhydride undergoes a disproportionation reaction, i.e., two molecules of the unsymmetrical anhydride combined to form two molecules of symmetrical anhydrides corresponding to the unsymmetrical anhydride acid components.

An object of the present invention is to provide a stabilized unsymmetrical anhydride of acetic and an acrylic acid. A further object is to provide an inhibitor capable of deterring both polymerization and disproportionation reactions of such compounds. Other objects will become apparent hereinafter as the invention is described.

Basically, the present invention concerns the stabilization of an unsymmetrical anhydride having the formula:

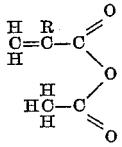

wherein R can be a halogen, an alkyl group, an aryl group or hydrogen. Stabilization of such unsymmetrical anhydrides is accomplished by adding to the unsymmetrical anhydride, nitrobenzene or a dinitrobenzene in an amount from .25 percent to 3 percent by weight of the total unsymmetrical anhydride.

It was found that when a dinitrobenzene was added to an unsymmetrical acetic-acrylic acid anhydride, the polymerization reaction favored by higher temperatures and the lower temperature disproportionation reaction, were effectively inhibited. The stabilized composition may be distilled to obtain pure unpolymerized acetic-acrylic acid anhydrides or it can be allowed to stand for long periods of time without substantial disproportionation occurring.

In a preferred embodiment of this invention, a dinitrobenzene was added to an unsymmetrical anhydride of acetic and methacrylic acid in an amount of about 1 percent by weight of the total composition. This stabilized composition was then distilled and again dinitrobenzene in an amount of about one percent was added to the purified unsymmetrical anhydride. Upon standing for one week at a temperature of about 20° C., disproportionation was observed to be less than 1 percent. If no inhibitor is added to the pure compound, disproportionation on the order of 60 percent occurs in the same length of time. Similarly, comparable results can be achieved by the substitution of mononitrobenzene for the dinitrobenzene as the polymerization and disproportionation reaction inhibiting material. Unsymmetrical anhydrides operable in the present invention are acetic-acrylic acid anhydride and acetic-α-substituted acrylic acid anhydride, such α-substituted acrylic acids including, for example, α-ethyl acrylic acid, α-benzyl acrylic acid and α-chloro acrylic acid. Methods of preparation for such compounds are taught in the German Patent 1,019,295.

Conventional inhibitors such as hydroquinone and copper salts are effective in preventing polymerization at higher temperatures but they have no deterrent effect on the disproportionation reaction. In fact, the copper salt inhibitors appear to increase the rate of disproportionation over that of the pure unsymmetrical anhydride.

It is obvious from the foregoing specification that modifications may be made in this invention without departing from the spirit and scope thereof and it should be understood that the invention is limited only as defined in the claims as read in light of the specification.

I claim:
1. A stabilized composition of matter comprising an unsymmetrical anhydride having the formula

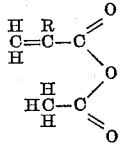

wherein R is selected from the group consisting of chlorine, methyl, ethyl, benzyl and hydrogen and a nitrobenzene containing up to 2 nitro groups in an amount from 0.25 to 3 percent by weight of the unsymmetrical anhydride.

2. A composition of matter as in claim 1 wherein the nitrobenzene is a dinitrobenzene.

3. A composition as in claim 1 wherein the nitrobenzene is mononitrobenzene.

References Cited in the file of this patent

FOREIGN PATENTS 1,019,295   Germany _____ Nov. 14, 1957

OTHER REFERENCES

Bartlett et al.: J.A.C.S., vol. 72, pages 1051–1057 (1950).
Hammond et al.: J. Polymer Sci., vol. 6, pages 617–624 (1951).
Kice, J.: Polymer Sci., vol. 19, pages 123–140 (1956).
Chem. Abstracts, 42, page 4960f (1948).
Chem. Abstracts, 34, page 22358 (1940).
Chem. Abstracts, 50, page 862e (1956).
Chem. Abstracts, 49, page 6706a (1955).